United States Patent [19]

Ferris

[11] Patent Number: 5,044,118

[45] Date of Patent: Sep. 3, 1991

[54] METHOD AND APPARATUS FOR CUT FLOWER STORAGE AND DISPLAY

[76] Inventor: John Ferris, 7 Vineberg Ct., Oakhurst, N.J. 07755

[21] Appl. No.: 370,309

[22] Filed: Jun. 22, 1989

Related U.S. Application Data

[63] Continuation-in-part of Ser. No. 250,362, Sep. 28, 1988, which is a continuation-in-part of Ser. No. 166,993, Mar. 11, 1988, which is a continuation-in-part of Ser. No. 927,648, Nov. 5, 1986.

[51] Int. Cl.$^5$ ............................................. A01G 31/00
[52] U.S. Cl. ........................................ 47/62; 47/41.01
[58] Field of Search ................ 47/82, 59, 41.01, 62

[56] References Cited

U.S. PATENT DOCUMENTS

| | | | |
|---|---|---|---|
| 147,849 | 2/1874 | Leslie | 47/82 |
| 460,810 | 10/1891 | Gunther | 47/82 |
| 875,235 | 12/1907 | Bastel | 47/82 |
| 2,686,389 | 8/1954 | Rozell | 47/41.01 |
| 4,006,559 | 2/1977 | Carlyon | 47/82 |
| 4,295,296 | 10/1981 | Kinghorn | 47/82 |
| 4,419,843 | 12/1983 | Johnson | 47/82 |
| 4,608,776 | 9/1986 | Kooy | 47/41.01 |
| 4,623,467 | 11/1986 | Hamlin | 210/652 |
| 4,754,571 | 7/1988 | Riechmann | 47/59 |
| 4,756,120 | 7/1988 | Arledge | 47/82 |

FOREIGN PATENT DOCUMENTS 335232  1/1904  France ................... 47/41.01

Primary Examiner—Henry E. Raduazo
Attorney, Agent, or Firm—Flehr, Hohbach, Test, Albritton & Herbert

[57] ABSTRACT

A cut flower storage and display assembly is provided wherein a plurality of storage and display containers are mountable in a vertically aligned relationship on a storage and display assembly. A liquid circulation and disinfection system is provided whereby liquid is continuously or intermittently disinfected and circulated through the liquid reservoirs of each container in a vertical column. The liquid circulation and disinfection system includes an ultraviolet disinfection unit for elimination of substantially all microbes from the circulating liquid, including substantially all bacteria, algae, viruses, yeasts, molds and fungi. An air cooling apparatus may also be provided to enhance the fresh appearance of cut flowers. The arrangement of storage and display containers in display assemblies of the present invention provides efficient, economical use of storage and display space.

15 Claims, 10 Drawing Sheets

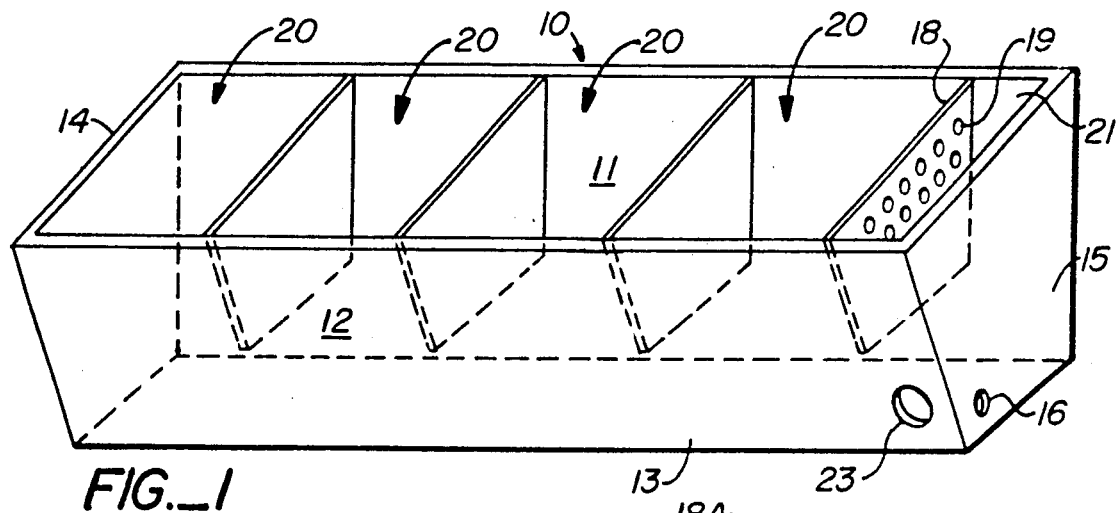
FIG._1
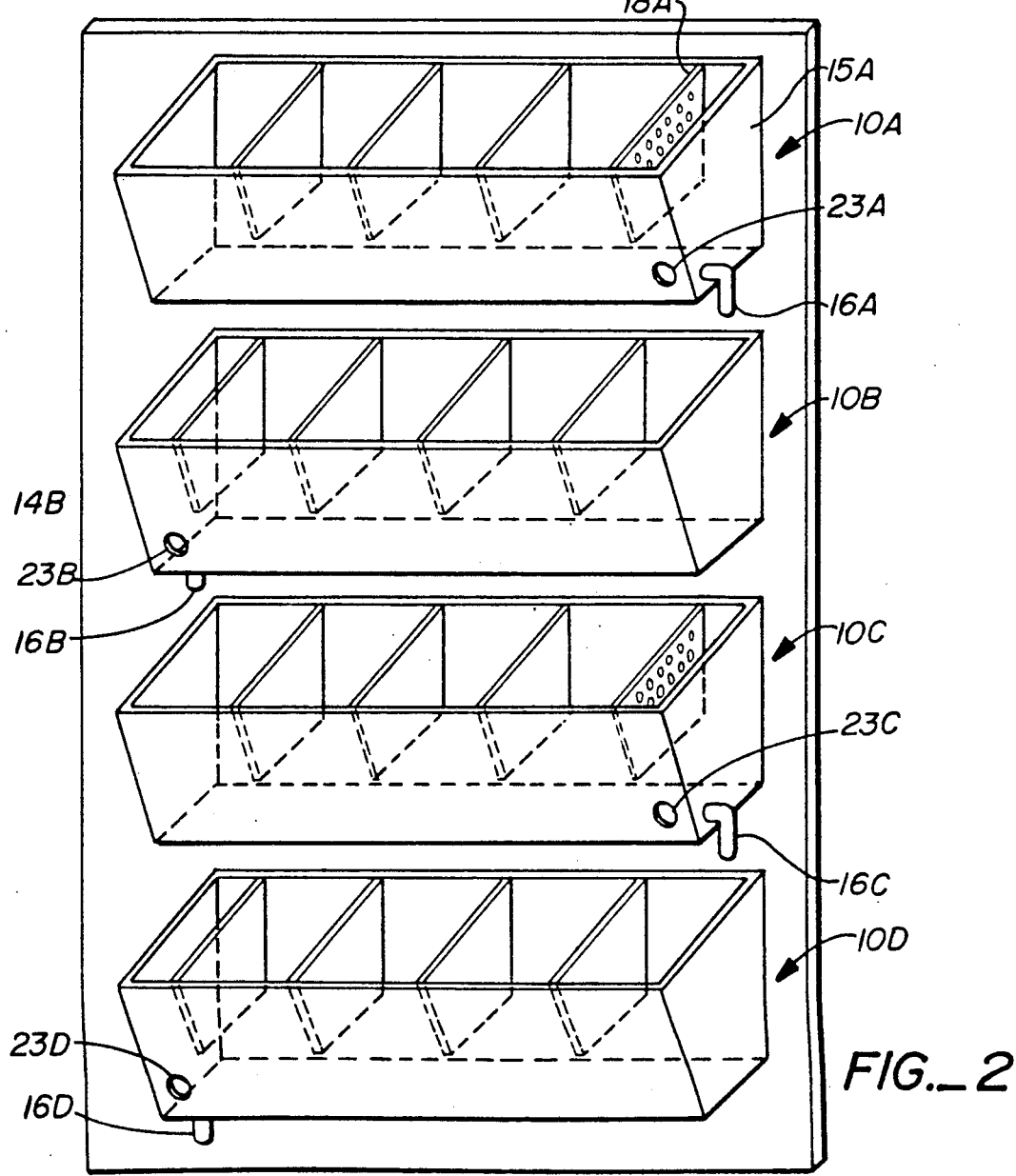
FIG._2

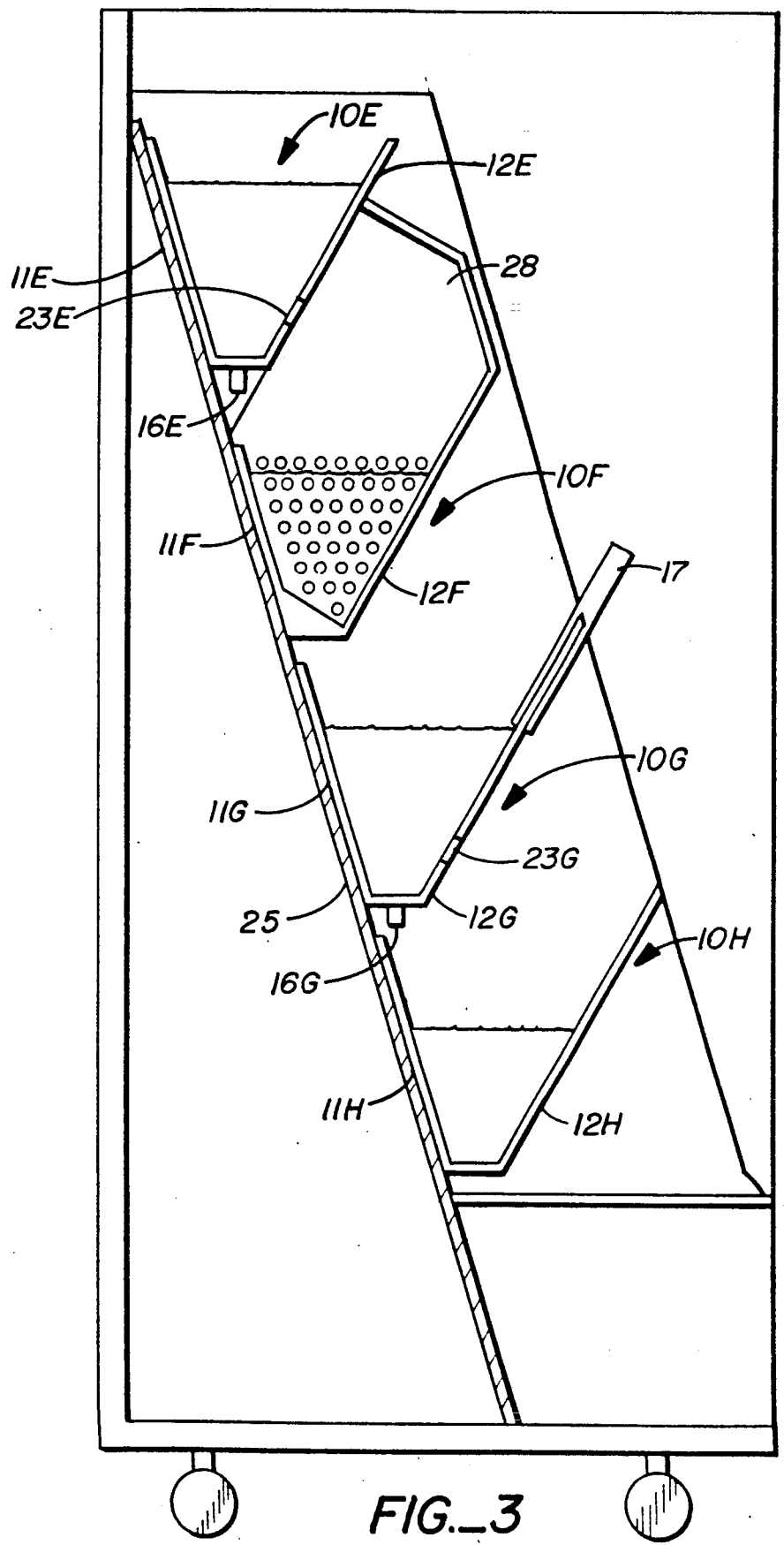
FIG._3

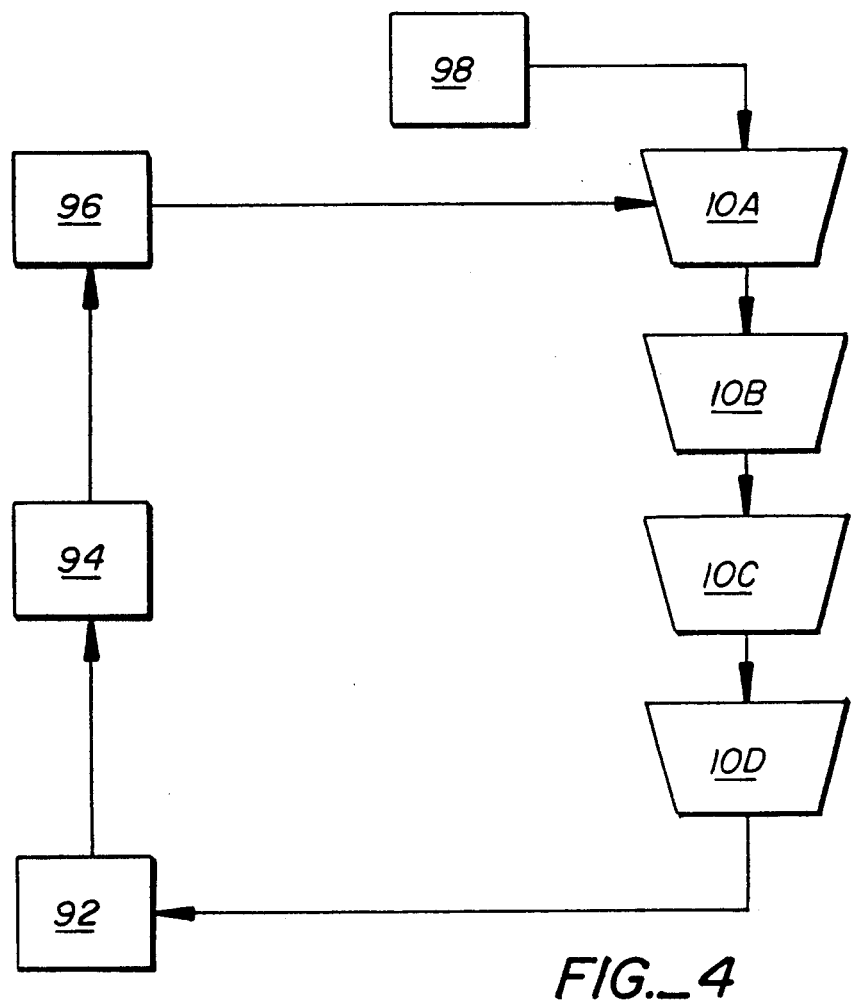
FIG._4
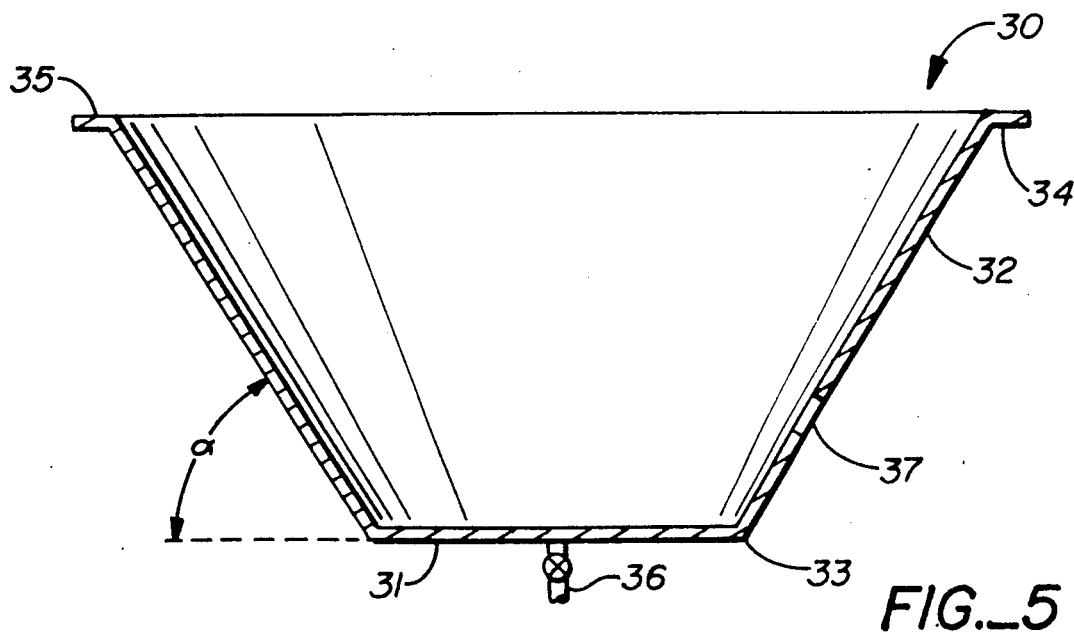
FIG._5

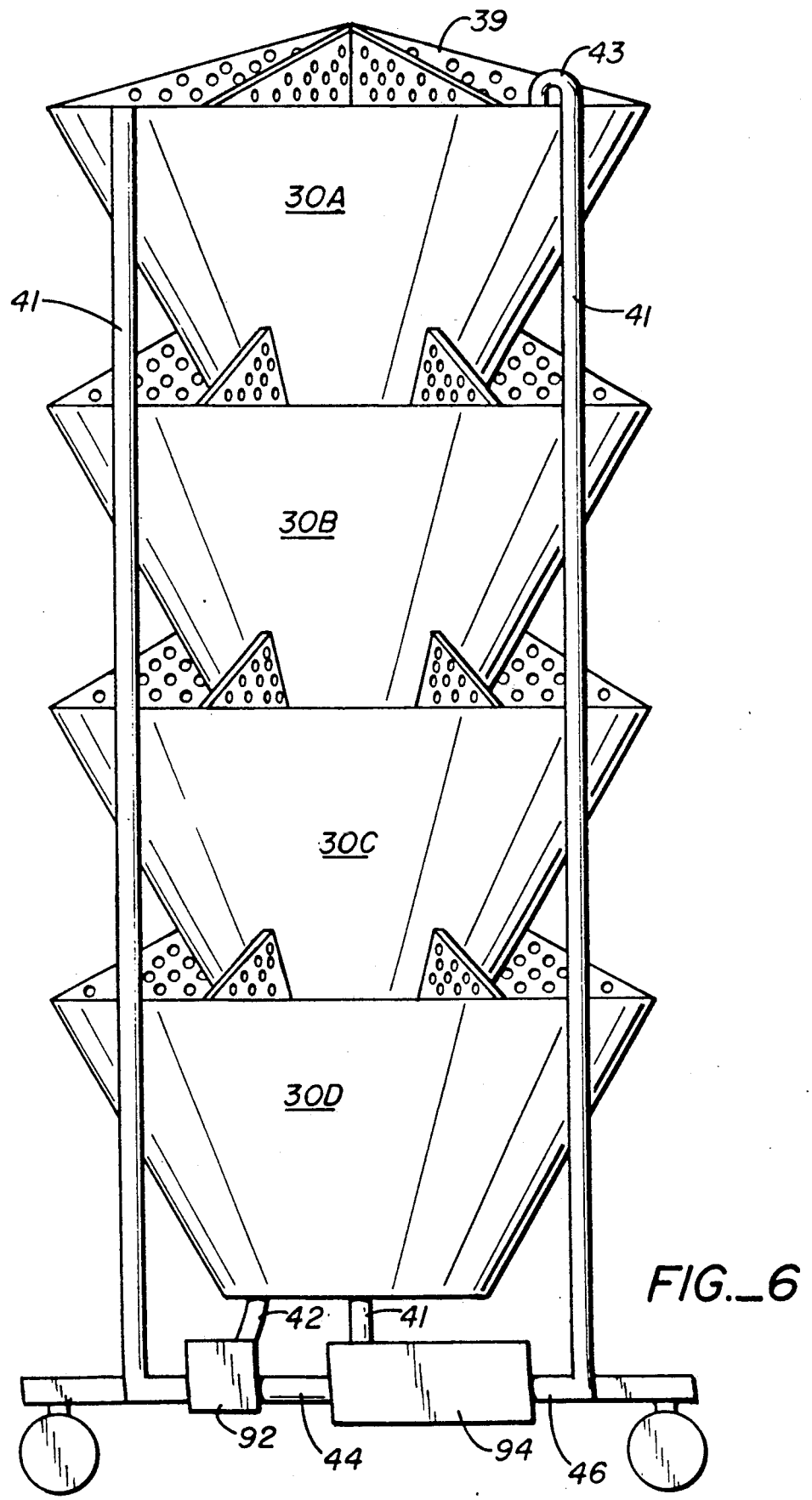
FIG._6

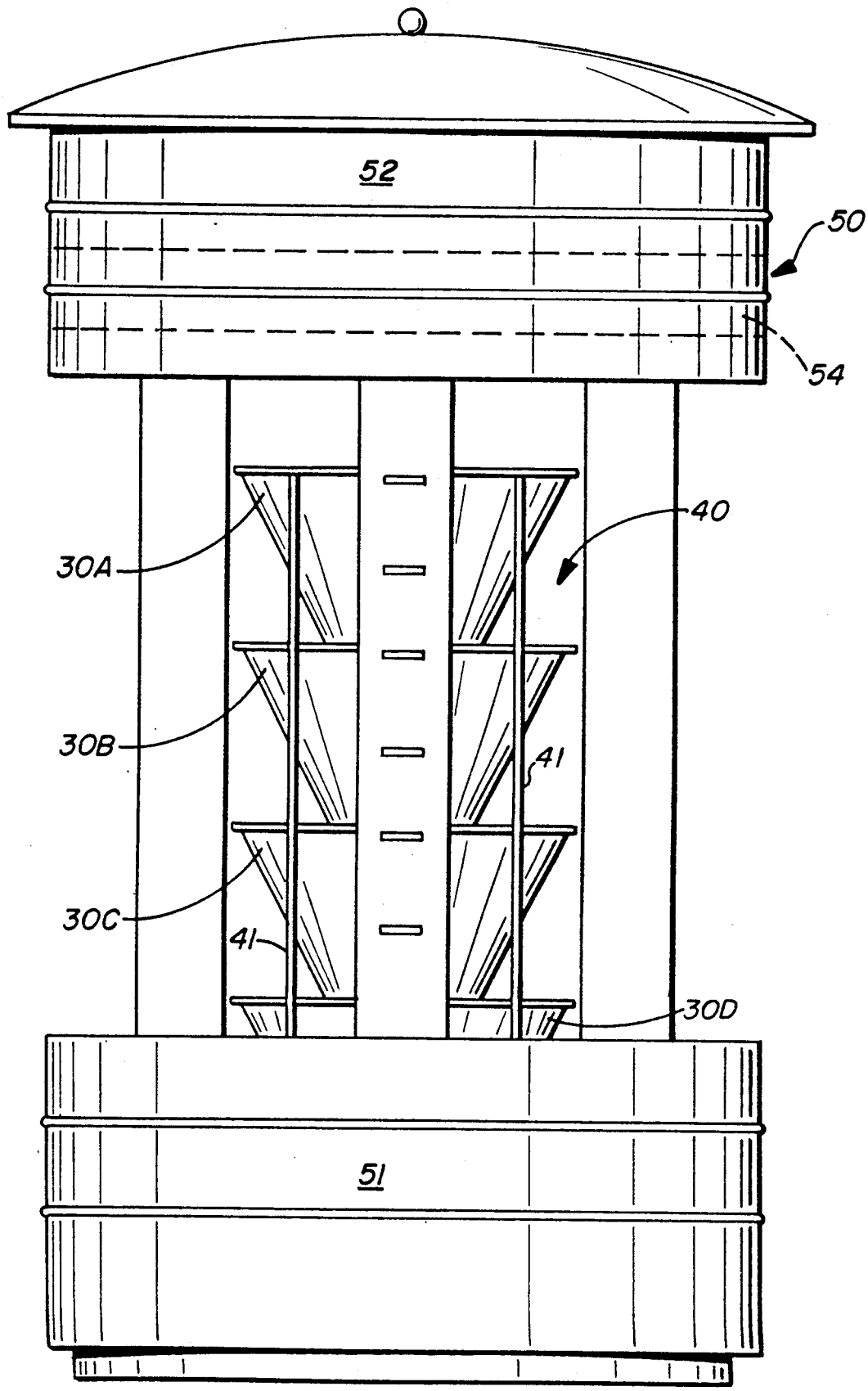
FIG._7

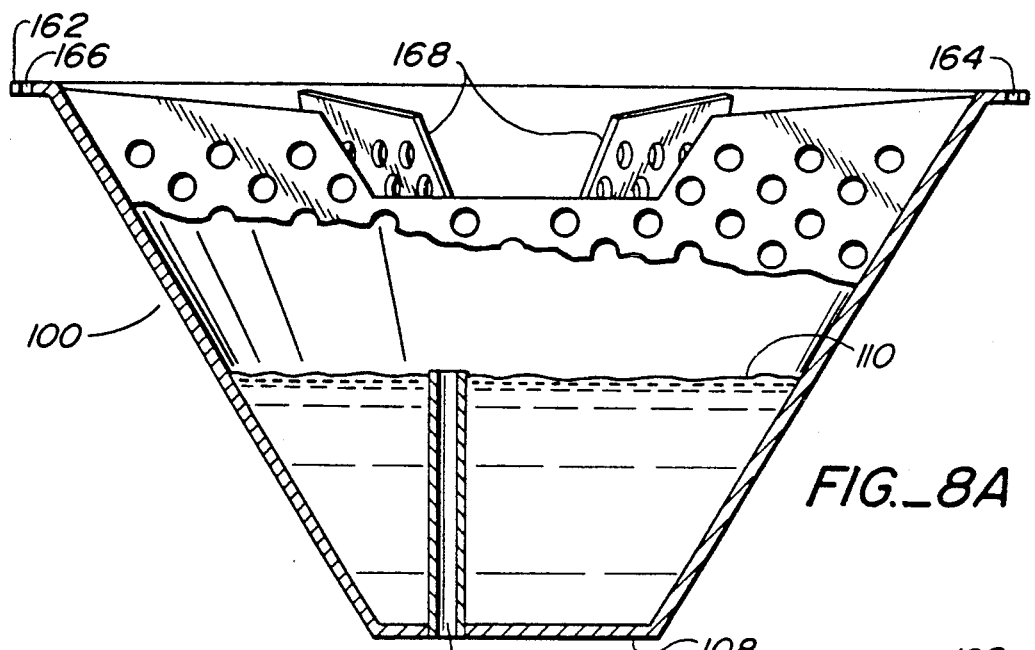
FIG._8A
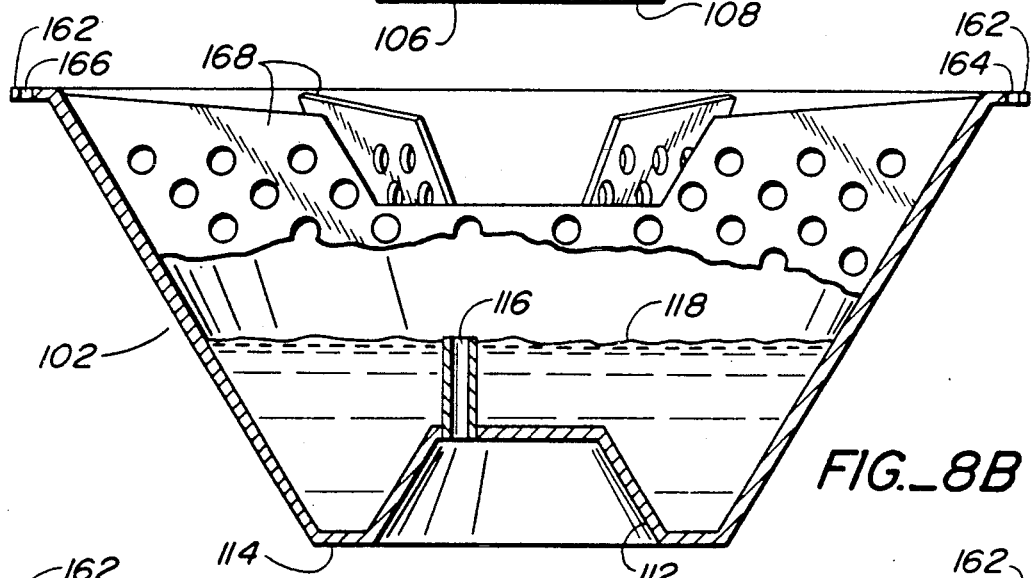
FIG._8B
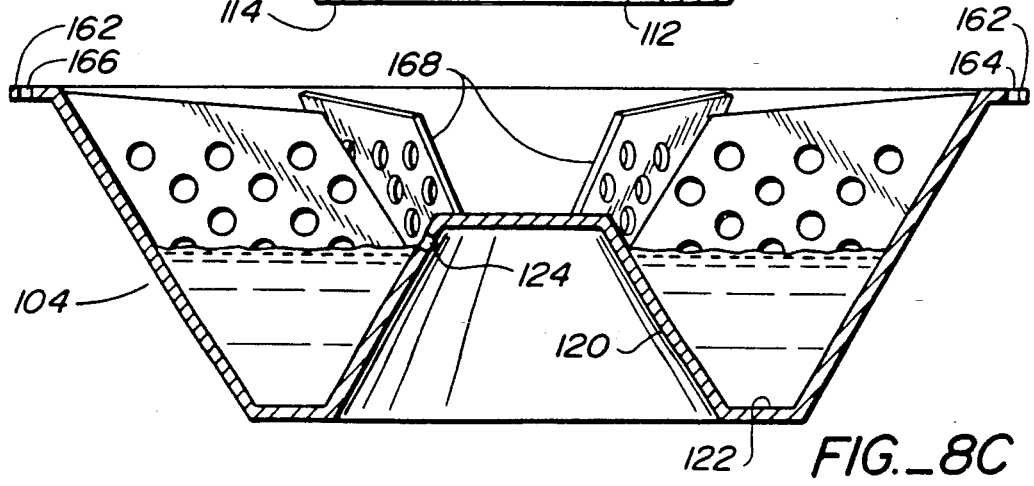
FIG._8C

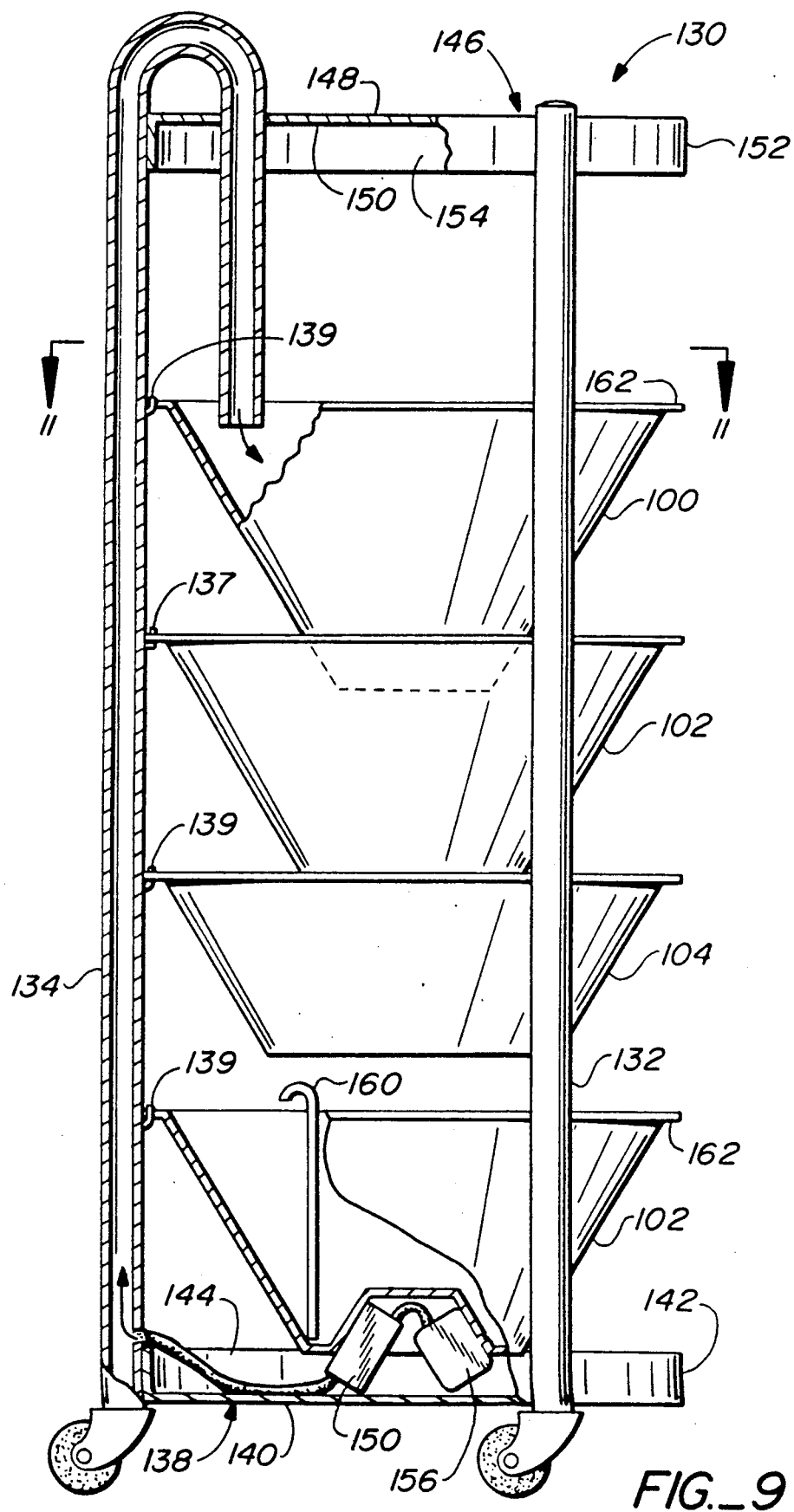
FIG._9

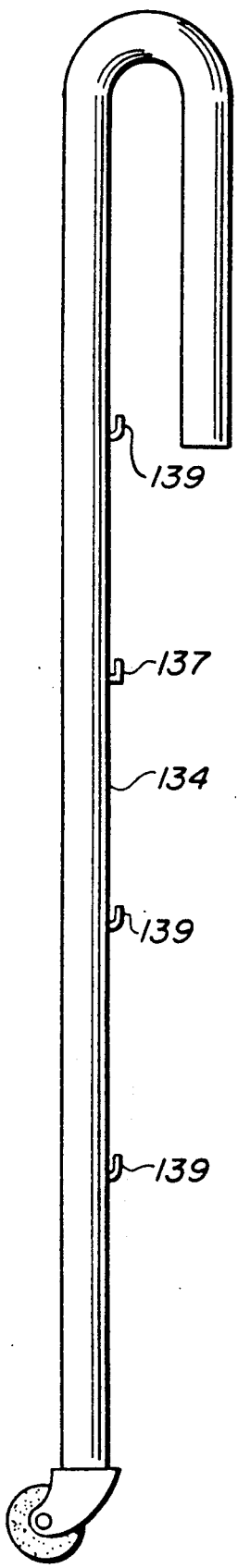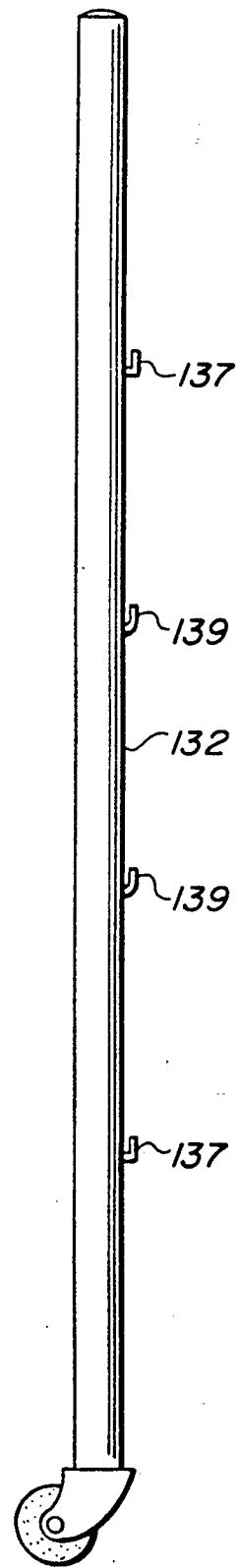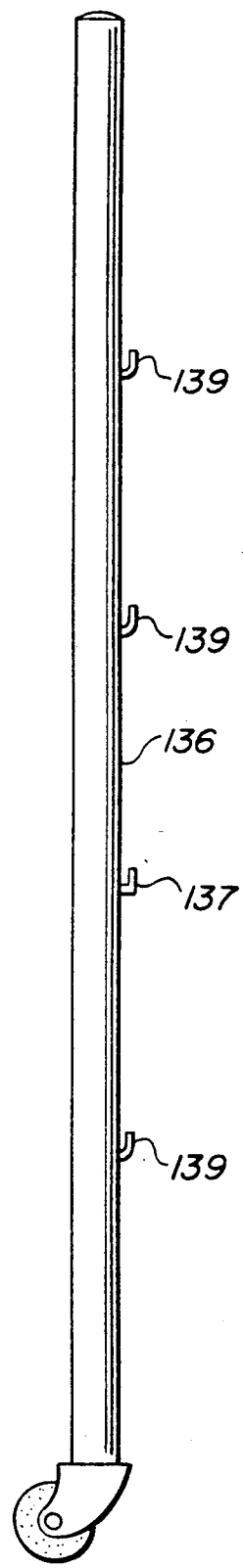
FIG._10A   FIG._10B   FIG._10C

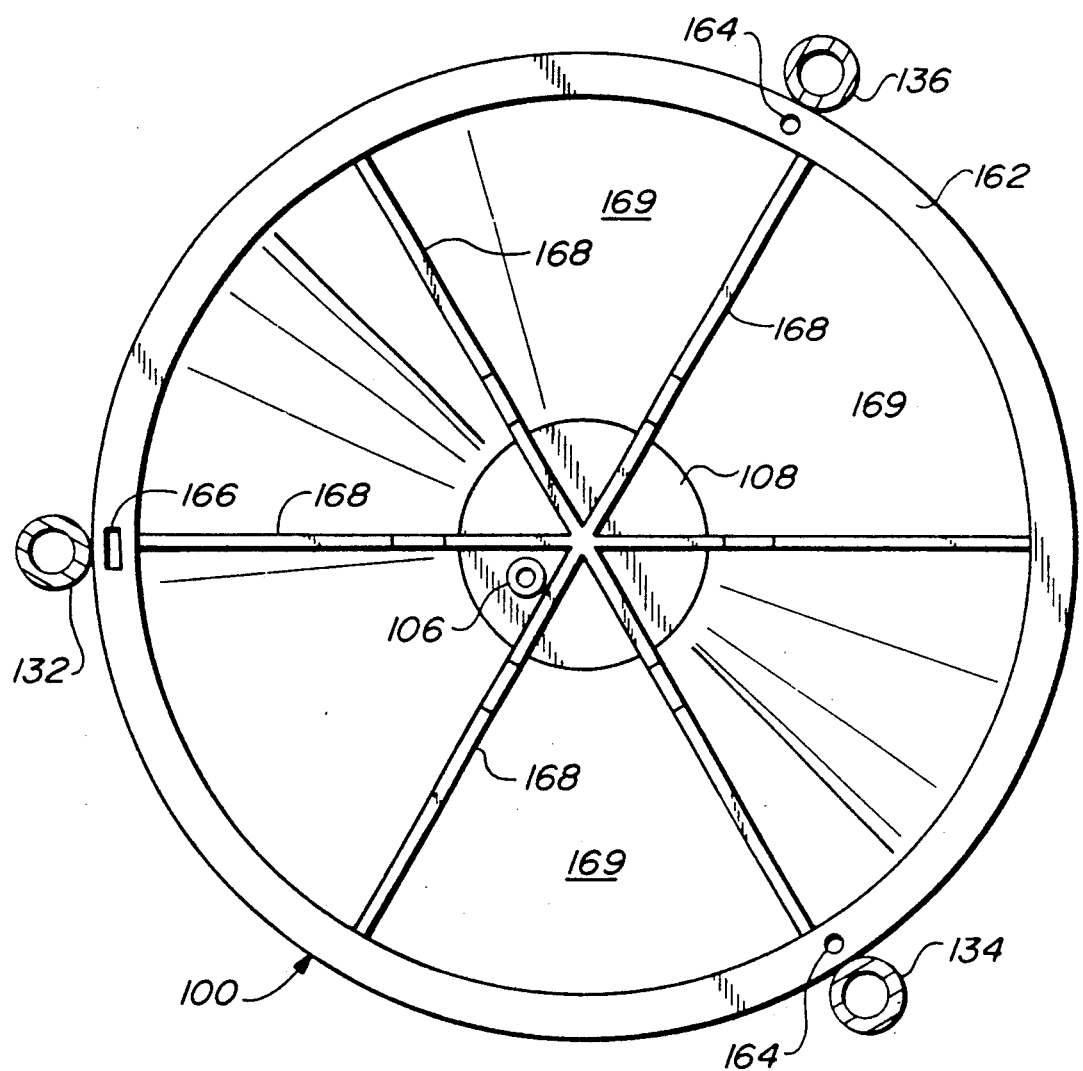
FIG._11

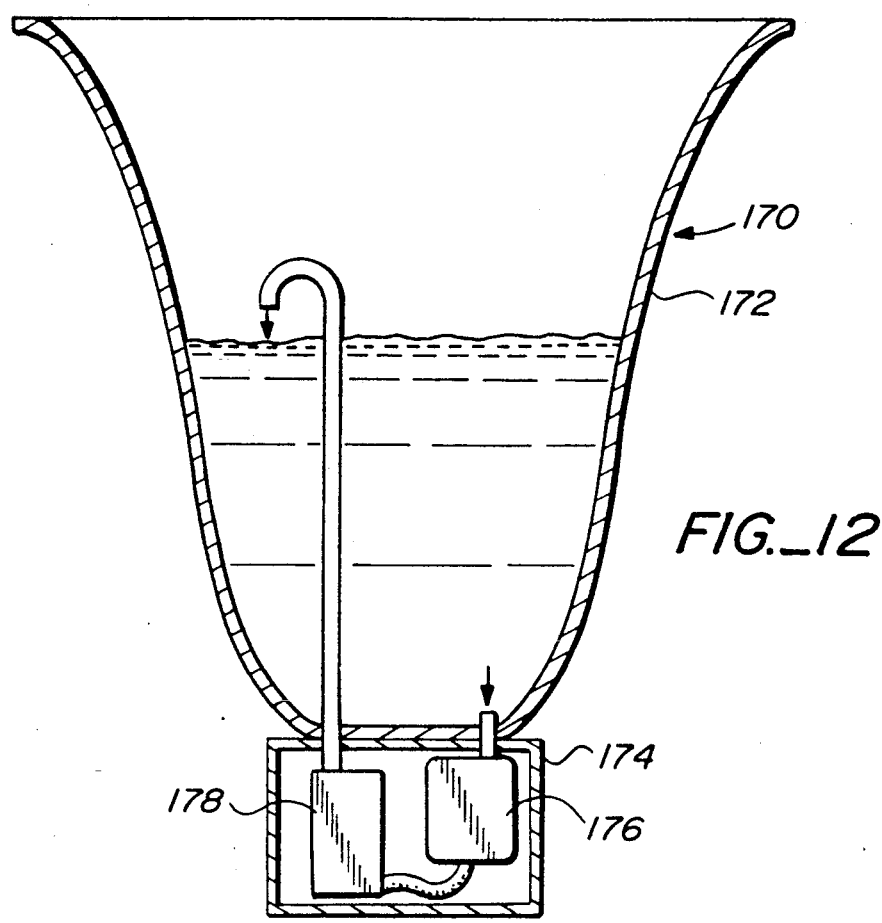
FIG._12
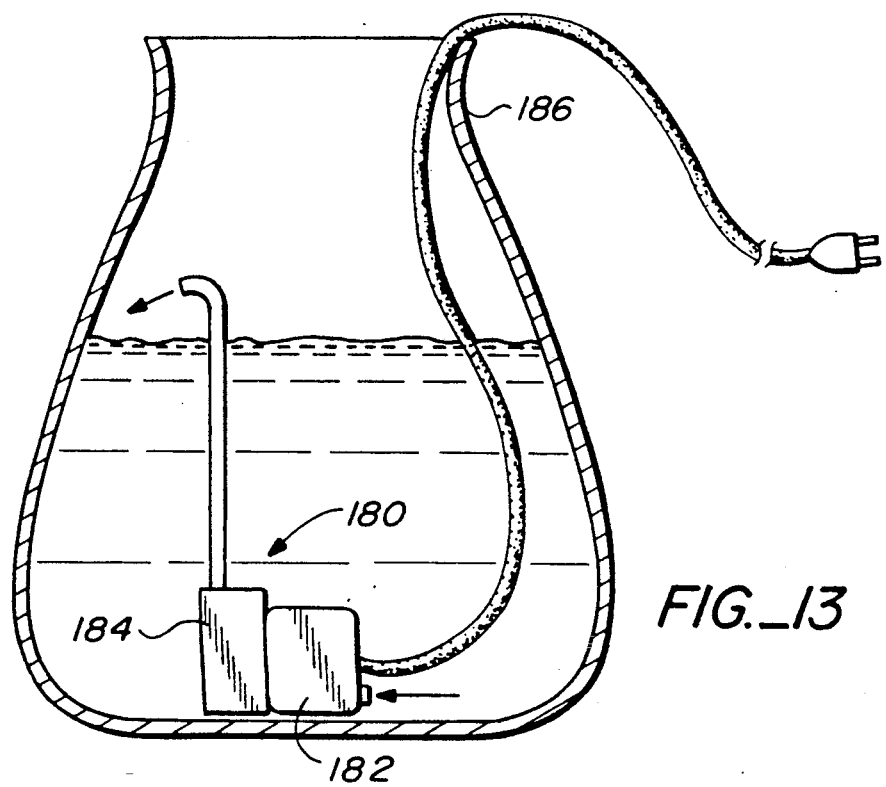
FIG._13

METHOD AND APPARATUS FOR CUT FLOWER STORAGE AND DISPLAY

This application is a continuation-in-part of U.S. patent application Ser. No. 250,362, filed Sept. 28, 1988, which is in turn a continuation-in-part of U.S. patent application Ser. No. 166,993, filed Mar. 11, 1988, now U.S. Pat. No. 4,884,364, which is itself a continuation-in-part of U.S. patent application Ser. No. 927,648, filed Nov. 5, 1986 now U.S. Pat. No. 4,802,304.

TECHNICAL FIELD

The present invention relates generally to methods and apparatus for providing efficient and economical storage and display of cut flowers and the like, and for prolonging the useful life of cut flowers, particularly at retail outlets. The present invention relates, more specifically, to a liquid circulation and disinfection system including an ultraviolet disinfection unit for use with cut flower storage and display assemblies to substantially eliminate microbial populations in the circulating liquid, thereby prolonging the useful lifetime of cut flowers and preserving their fresh appearance.

BACKGROUND ART

Cut flowers offered for sale at the retail level at florist shops, specialty markets, grocery markets, and the like, are conventionally stored and displayed in a plurality of individual buckets or other containers with liquid for preserving their freshness. A plurality of containers is generally arranged on the floor of the retail outlet, or on shelves for display and retail sale. Floral displays of this type typically have a cramped appearance, in addition to occupying a large amount of floor space. Despite the fact that cut flower storage and displays generally require a relatively large area of floor space and may require refrigeration, the growth rate of cut flower sales in retail outlets such as specialty markets, grocery stores, department stores, and the like, is substantial.

The useful lifetime of cut flowers, that is the period of time during which cut flowers maintain a fresh appearance, is generally limited by the rapid propagation of microorganisms in the liquid and accumulation of microorganisms in the xylem of the cut flowers. Propagation of microbes at the cut of the plant stem effectively blocks transport of water and nutrients to the leaves and blossoms, and results in rapid deterioration in the fresh appearance of the flowers and substantially reduces the useful lifetime of cut flowers.

In addition to the loss of freshness and appearance induced by the rapidly multiplying microbial populations, propagation of algae in the liquid typically results in unpleasant odors, and causes deterioration of the cut flower stems and leaves. It has been estimated that about 15% to about 20% of fresh cut flowers delivered to retail outlets are wasted and disposed of due to the deterioration in their appearance caused by the proliferation of the microbial and algal populations in the water source.

Proper maintenance of cut flowers requires frequent changes of the liquid in the containers in addition to thorough scrubbing of the containers to destroy the microbial and algal populations. To preserve the health and appearance of cut flowers, containers should be thoroughly cleaned and filled with fresh water at least once each day. Proper maintenance of cut flowers is thus a labor intensive operation, since cut flower containers are conventionally relatively small, and emptying, scrubbing, and refilling a plurality of small containers is a time consuming operation which is not susceptible to automation. Consequently, cut flowers are typically not cared for properly, particularly at the retail level, and premature deterioration and loss of freshness reduces their useful lifetime.

Soluble floral preservatives are known in the art, such as FLORALIFE, which may be added to the liquid to prolong the useful lifetime of cut flowers. Soluble algaecides are also known to reduce algal populations. Use of floral preservatives and algicides in cut flower retail outlets is effective to prolong the useful life of cut flowers, but it is also labor intensive, since each time the liquid is emptied and replaced in each of the containers, proper dosages of floral preservative and algicide must be added to the container and mixed with the fresh liquid.

A further problem that some users of such floral preservatives encounter is utilizing a proper dose of the floral preservative. If the floral preservative is used in too small an amount it is ineffective. In too large an amount, it is harmful to the cut flowers. The difference between an effective dose and a harmful dose is relatively small. These considerations mean that the user must maintain close control over the concentration of the floral preservative. Care must therefore be exercised when using containers of different sizes.

A variety of structures has been proposed for reducing the space required for growing plants. Examples of such structures are shown in the following issued U.S. patents: Schwartz U.S. Pat. No. 1,217,239, issued Feb. 27, 1917; Johnson, Sr. U.S. Pat. No. 3,293,798, issued Dec. 27, 1966; Haile U.S. Pat. No. 3,374,574, issued Mar. 26, 1968; Hundt U.S. Pat. No. 3,447,261, issued June 3, 1969; Chute U.S. Pat. No. 3,445,055, issued July 15, 1969; Canova U.S. Pat. No. 4,123,873, issued Nov. 7, 1978; Karpisek U.S. Pat. No. 4,334,387, issued June 15, 1982; Frank U.S. Pat. No. 4,355,485, issued Oct. 26, 1982, and Karpisek U.S. Pat. No. 4,380,136, issued Apr. 19, 1983. Johnson Sr. U.S. Pat. No. 3,452,475, issued July 1, 1969 teaches a vertically tiered self-irrigated planter including a plurality of vertically stacked trays having peripheral annular troughs containing soil for plants. The trays are provided with annular water chambers arranged inwardly of the soil troughs and in communication with the soil troughs at their lower end portions. The vertically stacked trays are provided with overflow apertures to allow water to drip from upper to successively lower trays. Water reservoirs are also provided with water level control and water discharge means.

Despite the availability of such structures for growing and cultivating plants, a similar development of space efficient structures for storage and display of cut flowers has not taken place. The state of the art for conserving space in the storage of cut flowers in refrigerated space is provision of conventional shelving, as shown in an article entitled "Adjustable Storage Shelves," *Florist's Review*, July 1986. Cut flower display units are also available in which a plurality of stepped receptacles are provided for cut flower display and sale, particularly at the retail level. Each of the stepped receptacles is provided with a water inlet means and a drain for filling and emptying the receptacles. While this type of display unit may provide more effective and attractive storage and display of cut flowers, it still requires frequent changes of water and thorough cleaning of the receptacles to reduce microbial populations and preserve the freshness of cut flowers.

Accordingly, it is an objective of the present invention to provide a method and apparatus for cut flower storage and display which prolongs the useful lifetime of cut flowers and the like.

It is another objective of the present invention to provide a method and apparatus for economical and attractive storage and display of cut flowers in a plurality of containers mounted on a storage and display assembly.

It is yet another objective of the present invention to provide a method and apparatus for cut flower storage and display which reduces cut flower maintenance costs, and particularly labor costs typically associated with the maintenance and preservation of cut flowers and the like.

It is yet another objective of the present invention to provide a method and apparatus for cut flower storage and display which substantially eliminates harmful microbial populations simultaneously in a plurality of cut flower containers mounted on a support assembly.

It is still another objective of the present invention to provide a system for liquid circulation and disinfection which preserves the fresh appearance and prolongs the useful lifetime of cut flowers during storage and display.

It is yet another objective of the present invention to provide a system whereby ambient air is cooled and circulated in the vicinity of a plurality of cut flower storage and display containers to preserve the fresh appearance and prolong the useful lifetime of cut flowers during storage and display.

It is still another objective of the present invention to provide an inexpensive, versatile storage and display assembly for cut flowers and the like, which is conveniently adaptable to various storage and display applications, and which is particularly suitable for use in retail outlets.

DISCLOSURE OF THE INVENTION

A cut flower storage and display container in accordance with the present invention includes a liquid reservoir in which cut flowers or the like may be placed and provided with a continuous supply of circulating liquids. Liquid reservoirs according to the present invention may embody a wide variety of configurations. For example, they may comprise individual containers, or larger trough-like or bowl-like structures defining a single large receptacle or a plurality of contiguous smaller receptacles. Cut flower storage and display containers are provided with liquid circulation means penetrating the liquid reservoirs to provide liquid circulation among a plurality of vertically aligned containers, and to maintain a desired liquid level in each reservoir. Suitable types of cut flower storage and display containers are fully described in copending U.S. patent applications Ser. Nos. 927,648 filed Nov. 5, 1986 and 166,993 filed Mar. 11, 1988, the teachings of which are incorporated by reference in their entirety herein.

Cut flower storage and display containers of the present invention are preferably mounted in spaced relationship on a support structure or rack to form at least one generally vertical column. Suitable stationary or movable freestanding support racks may be provided for mounting a plurality of containers in a plurality of generally vertical columns to form modular storage and display assemblies having generally rectangular, circular, or other configurations. The storage and display assemblies may be provided with casters, or the like, so that they may conveniently be moved between storage, cleaning, and display locations.

The cut flower storage and display assembly of the present invention incorporates a liquid circulation and disinfection system including an ultraviolet disinfection unit for eliminating microbial populations, including bacteria, algae, viruses, yeasts, molds and fungi from the circulating liquid, and a pump means for conveying liquid to the uppermost container. Utilizing the liquid circulation system of the present invention, liquid may be continuously or intermittently circulated to the uppermost containers to fill the liquid reservoir of the uppermost container to a desired liquid level, whereupon liquid is discharged from the uppermost container into the liquid reservoir of the adjacent lower container until the liquid reservoir of the adjacent lower container is filled to the desired liquid level, and liquid is similarly discharged to the adjacent lower container. Liquid is thus provided to fill the liquid reservoir of each container in a column to a desired liquid level sequentially from the uppermost to the lowermost container, and excess liquid is discharged from the lowermost container. The liquid reservoir of each container remains filled to the desired liquid level as liquid is continuously or intermittently circulated through each column of storage and display containers.

The liquid circulation and disinfection system of the present invention facilitates effective use of floral preservatives and nutrient supplements since proper dosages of floral preservatives, nutrient supplements, and the like may be introduced and circulated through the liquid reservoir of each container mounted on a support rack assembly. Continuous or intermittent liquid circulation overcomes the problems associated with separately measuring proper dosages of floral preservatives, nutrient supplements, and the like into each container each time the liquid is replaced.

The ultraviolet disinfection unit forming part of the cut flower storage and display assembly of the present invention is capable of producing a dosage of short wavelength ultraviolet light which is lethal to substantially all microorganisms, including bacteria, algae, viruses, yeasts, molds and fungi. The rate of liquid circulation, the type of ultraviolet disinfection unit, and the dosage of ultraviolet light utilized may be adapted for various applications, but the combination of liquid circulation and disinfection with ultraviolet light significantly prolongs the useful lifetime and preserves the fresh appearance of cut flowers and plants.

In addition to providing liquid circulation and treatment with ultraviolet light dosages which are lethal to substantially all microorganisms, it is desirable, for many applications, to circulate cooled air in the vicinity of the cut flower storage and display containers. Circulation of cooled air efficiently chills the cut flowers and the atmosphere surrounding them, without requiring refrigeration of the entire storage or display area. The use of cooled air is believed to maintain the blooms of cut flowers in a bud-like or closed state for an extended period of time.

BRIEF DESCRIPTION OF THE DRAWINGS

The above-mentioned and additional features of the present invention and the manner of obtaining them will become apparent, and the invention will be best understood by reference to the following more detailed description, read in conjunction with the accompanying drawings, wherein:

FIG. 1 shows a perspective view of a trough-like cut flower storage and display container in accordance with the present invention;

FIG. 2 shows a perspective view of a plurality of the cut flower storage and display containers of FIG. 1 arranged in vertically spaced relationship;

FIG. 3 shows a side view of a storage and display rack in accordance with the present invention with a plurality of storage and display containers mounted thereon;

FIG. 4 shows a schematic flow diagram illustrating the liquid circulation and disinfection system for use with cut flower storage and display assemblies according to the present invention;

FIG. 5 shows a cross-sectional view of another cut flower storage and display container according to the present invention;

FIG. 6 a schematic view of a plurality of the cut flower storage and display containers of FIG. 5 arranged in vertically spaced relationship to provide an integrated cut flower storage and display unit incorporating a liquid disinfection and circulation system;

FIG. 7 shows a retail display assembly incorporating the cut flower storage and display unit of FIG. 6.

FIGS. 8A, 8B and 8C are cross-sectional views of a further form of cut flower storage and display containers in accordance with the invention.

FIG. 9 is a side view in somewhat schematic form of a display unit incorporating a plurality of the containers of FIGS. 8A-8C.

FIGS. 10A, 10B and 10C are side views of a portion of the display unit of FIG. 9.

FIG. 11 is a cross-section view, taken along the line 11—11 in FIG. 9.

FIG. 12 is a schematic and perspective view of another apparatus in accordance with the invention.

FIG. 13 is a schematic and perspective view of a further apparatus in accordance with the invention.

BEST MODE OF CARRYING OUT THE INVENTION

As shown in FIGS. 1-3, trough-like cut flower storage and display container 10 includes back wall 11 and front wall 12 joined by bottom wall 13 and end walls 14 and 15. At least one of the back or front walls is preferably arranged at an obtuse angle with respect to bottom wall 13. For example, in the embodiment illustrated in FIGS. 1 and 2, back wall 11 is arranged at a substantially right angle to bottom wall 13, while front wall 12 is arranged at an obtuse angle of about 100° to about 150° with respect to bottom wall 13. Trough-like container 10 provides a liquid reservoir and receptacle for storing and/or displaying fresh flowers.

Liquid circulation means 23 is preferably provided in angular front wall 12 of the trough-like container to facilitate liquid circulation among a plurality of containers. Liquid circulation means 23 preferably comprises a hole penetrating front wall 12 above the level of bottom wall 13 and in proximity to one of the end walls. Liquid discharge means 16 is provided in or in proximity to bottom wall 13 of the container for discharging all liquid from the trough-like container for purposes of maintenance, storage or the like. Liquid discharge means 16 may simply comprise a hole provided in bottom wall 13, as shown in FIG. 1, but it preferably comprises a valved drain means. Suitable types of valved drain means are well known in the art.

Perforated dividers 18 are adapted for use with trough-like containers 10 to divide the container into a plurality of contiguous receptacles. A plurality of perforations 19 is preferably distributed over substantially the entire surface area of each divider 18 to permit passage of fluids, while providing discrete contiguous receptacles 20 for receiving flowers. Dividers 18 conform generally to the configuration of end walls 14 and 15 and are preferably detachably fastened in the container. According to the preferred embodiment shown in FIG. 1, dividers 18 do not extend to bottom wall 13, but extend for about 50% to about 80% of the depth of side walls 14 and 15. This arrangement provides an unimpeded liquid flow path in proximity to bottom wall 13 and aids in collection and removal of waste materials suspended in the liquid, such as leaves, stems, and the like. It is also preferred to provide a perforated divider 18 in proximity to liquid circulation means 23 and liquid discharge means 16 to provide liquid discharge zone 21 having a relatively small volume which does not receive cut flowers, but facilitates liquid discharge and circulation.

FIG. 2 illustrates a cut flower storage and display assembly utilizing a plurality of the containers of FIG. 1 mounted on a support surface and arranged in vertically aligned relationship. This assembly is adapted for use with a liquid circulation system whereby liquid is provided to container 10A, and is circulated through containers 10B, 10C, and 10D sequentially. As shown in FIG. 2, liquid circulation means of vertically adjacent containers are preferably located adjacent opposite side walls of the containers. For example, liquid circulation means 23A is provided in proximity to end wall 15A of container 10A, while liquid discharge means 23B is provided in proximity to end wall 14B of container 10B. This arrangement promotes circulation of liquid through the contiguous receptacles and establishes a preferred liquid flow pattern. Liquid discharge means 16A-D may also be staggered, as shown in FIG. 2, to promote liquid discharge. As described above and as shown in FIG. 2, it is advantageous to mount a perforated divider in proximity to each liquid discharge means to determine a liquid discharge zone and promote liquid flow.

FIG. 3 illustrates another cut flower storage and display assembly utilizing trough-like containers 10E-10H of the type described above. As shown in FIG. 3, both the back walls 11E-11H and the front walls 12E-12H of containers 10E-10H are arranged at an obtuse angle with respect to bottom walls 13E-13H. This configuration facilitates mounting of the containers on support surface 25 arranged at an angle to the vertical, which provides more space for flowers and a more compact storage and display assembly, since the troughs can be mounted closer to one another. Perforated divider 28, as shown in FIG. 3, may be enlarged to extend beyond the receptacle area defined by the trough-like containers, and perforated dividers 28 may be supported between two vertically adjacent containers, as shown. FIG. 3 also illustrates use of extender 17 which is detachably mounted on front wall 12G of trough-like container 10G to provide additional support for cut flowers having long stems or the like.

Trough-like storage and display containers 10 may be mounted on the walls of a refrigerated cooler to store cut flowers, or they may be mounted on a stationary or movable support structure in a retail outlet to display cut flowers for sale. Although the storage and display assemblies illustrated in FIGS. 2 and 3 utilize four vertically aligned containers, it is readily apparent that a plurality of storage and display containers, and preferably from about two to about eight containers, may be utilized in a suitably designed storage and display support means. The cut flower storage and display containers and assemblies of the present invention provide high density storage and display of cut flowers and the like, which provides more efficient use of expensive cooler space and retail sales space in a store. The storage and display assemblies of the present invention provide substantially increased storage and display capacity per unit surface area.

The cut flower storage and display assemblies described above are adapted for use with liquid disinfection and circulation systems. As shown schematically in FIG. 4, the liquid disinfection and circulation system of the present invention includes pump 92 for conveying liquid from the lowermost cut flower storage and display container 10D to the uppermost storage and display container 10A in a generally vertical column of containers. Liquid distribution means 96 may be provided if distribution of liquids to a plurality of locations is necessary. When the liquid reservoir of container 10A has been filled to the desired liquid level, excess liquid is discharged through liquid discharge means in the container. Due to the vertically aligned arrangement of storage and display containers, liquid discharged from container 10A flows into the liquid reservoir of container 10B, the adjacent lower container. In this fashion, a plurality of storage and display containers arranged in a vertical column is sequentially filled with liquid to the desired liquid level. A steady-state system may thus be established for circulating liquid through liquid reservoirs of a plurality of vertically arranged storage and display containers. Liquid circulation may be provided continuously or intermittently according to the system of the present invention.

The liquid circulation and disinfection system of the present invention additionally includes ultraviolet disinfection unit 94 for eliminating substantially all microorganisms, including bacteria, algae, viruses, molds and fungi, from the circulating liquid. Utilization of ultraviolet disinfection unit 94 provides elimination of substantially all microbes which have a detrimental effect on the health and appearance of cut flowers from the circulating liquid, thereby significantly prolonging the useful lifetime of cut flowers stored and/or displayed in assemblies of the present invention. The use of an ultraviolet disinfection unit in the liquid circulation and disinfection system of the present invention provides substantially complete (about 99-100% complete) removal of microorganisms from the circulating liquid at a very low operating cost.

Ultraviolet disinfection units capable of producing a dosage of short wavelength ultraviolet light which is lethal to substantially all microorganisms are known in the art. A suitable germicidal ultraviolet lamp generates short wavelength ultraviolet light having a wavelength of about 252-255 nanometers, and preferably about 253.7 nanometers. Circulating liquids are preferably disinfected by conveying the liquid through tubing which is transparent to ultraviolet light within the disinfection unit, while producing an ultraviolet light dosage which is lethal to microorganisms. The lethal ultraviolet dosage is preferably from about 3,000 to about 50,000 microwatt-seconds per square centimeter, and most preferably from about 3,000 to about 20,000 microwatt-seconds per square centimeter. Teflon tubing is preferred for use in the ultraviolet disinfection unit, since it is substantially completely transparent to ultraviolet light, and particulate materials do not adhere to the surface of the Teflon tubing, so that it remains substantially transparent to ultraviolet light during longterm operation. Use of Teflon tubing in the ultraviolet disinfection unit is important since it substantially reduces maintenance requirements. Suitable ultraviolet liquid disinfection units, such as the Model 01H, are sold by Northland Technologies, Inc., 1115 Chestnut St., Burbank, Calif. 91506.

Disinfection of the circulating liquid in the ultraviolet disinfection unit eliminates substantially all microorganisms from the circulating liquid, and thus eliminates the microbial populations in the liquid reservoirs of all storage and display containers. Since microorganisms, including bacteria, algae, yeasts, viruses, molds and fungi are continuously or intermittently eliminated from the circulating liquid, the circulation and disinfection system of the present invention provides a clean and substantially maintenance-free operating system. In fact, the maintenance requirements for storage and display assemblies utilizing the liquid circulation and disinfection system of the present invention are minimal. For example, conventional containers for storage and display of cut flowers and the like should be emptied of liquid, thoroughly scrubbed, and refilled with fresh liquid at least once each day. The storage and display containers of the present invention used in conjunction with a liquid circulation and disinfection system utilizing an ultraviolet disinfection unit require draining and refilling with fresh liquid on the order of about once each month, and they require thorough cleaning much less frequently. This represents a tremendous savings in labor and maintenance costs, in addition to prolonging the useful lifetime of cut flowers.

Another advantage provided by the liquid circulation and disinfection system of the present invention is that proper dosages of floral preservatives, nutrients, and the like may be introduced to the liquid and circulated thereafter to the liquid reservoir of each storage and display container. This arrangement thus provides effective use of floral preservatives and the like, and significantly reduces the cost, measured in materials and maintenance time, of using such beneficial compounds.

According to an especially preferred embodiment of the cut flower storage and display system of the present invention, air cooling means 98 is provided in connection with the cut flower assembly to cool ambient air to temperatures of from about 45° to about 55° F. Circulation of cooled air is believed to maintain blooms in a bud-like or closed state for a longer period of time, which enhances the fresh appearance of cut flowers.

FIG. 5 illustrates a preferred embodiment of cut flower storage and display container 30. Container 30 is generally bowl-shaped, having a larger diameter upper peripheral edge 34 and a smaller diameter lower peripheral edge 33. Container 30 may be rounded and generally hemispherical in configuration, or it may embody a more angular bowl-shaped configuration. As shown in FIG. 5, continuous side wall 32 is joined to planar bottom wall 31 and forms an angle a of about 35° to about 75°, and preferably about 60° therewith. Continuous annular flange 35 is provided at upper peripheral edge 34 of the bowl-shaped container, and annular flange 35 may be provided with one or more mounting means to facilitate mounting to a support structure. Valved outlet 36 is preferably provided in a central portion of bottom wall 31, and one or more liquid circulation means 37 is preferably provided in a lower portion of side wall 32 to provide liquid circulation among a plurality of containers arranged in a vertically aligned relationship.

FIG. 6 illustrates a plurality of bowl-shaped cut flower storage and display containers 30 mounted on a support structure including a liquid circulation and disinfection system to provide an integrated cut flower storage and display unit 40. Bowl-shaped containers 30A-D are arranged in a vertically aligned relationship so that the bottom walls of containers 30A-C are positioned at generally the same level as the upper peripheral edges of the adjacent lower containers 30B-D, respectively. Alternatively, the bottom walls of containers 30A-C may be positioned in the internal volume of the adjacent lower containers 30B-D to provide a more vertically compact arrangement.

The containers are supported in a vertically aligned relationship by means of a plurality of vertical upright structures 41. Vertical upright support structures 41 are preferably radially arranged with respect to the centers of containers 30A-D. According to an especially preferred embodiment, three vertical upright support structures are equidistantly spaced from one another. Mounting means are provided in proximity to the continuous outer flange of each container for mounting the containers on the vertical support structures. For example, hemispherical recesses may be provided in the annular flange 35 of each of the containers and suitable bracket means may be provided for mounting the containers to the upright supports.

Perforated dividers 39 may be provided to divide the internal volume of bowl-shaped containers 30 into a plurality of contiguous receptacles in much the same fashion as described above with respect to trough-like containers 10. A star-shaped arrangement of dividers may be provided, as shown mounted in bowl-like container 30A in FIG. 6, or individual perforated dividers may be supported between the side walls of adjacent containers.

In addition to supporting a plurality of containers in a vertically aligned relationship, at least one of the upright structures 41 preferably serves as a liquid conduit for passage of circulating liquid from the lowermost to the uppermost container. As shown in FIG. 6, the lowermost container 30D is provided with liquid discharge conduit 42 for conveying liquid to liquid pump 92. Circulating liquid is then conveyed through liquid conduit 44 to disinfection unit 94. After circulating liquid has been disinfected, it is conveyed through upright structure 41 and deposited in the uppermost container 30A through liquid discharge tube 43.

FIG. 7 shows integrated cut flower storage and display unit 40 positioned in generally circular storage and display assembly 50 which provides a convenient and aesthetic retail display assembly. Retail display assembly 50 is preferably stationary and hinged along a vertical axis to permit removal of integrated storage and display unit 40 from the retail display assembly. Integrated storage and display unit 40 is a movable unit and may thus be removed from the storage and display assembly for purposes of routine maintenance, such as draining and cleaning the containers. Lower portion 51 of the display preferably provides interior storage space and shields the pump and disinfection units from view.

Upper portion 52 of the assembly outer unit is preferably provided with an air cooling system whereby ambient air is cooled by passage through an annular plenum 54 mounted in the upper portion, and cooled air is discharged onto the flowers retained in the containers of the inner display unit.

FIGS. 8A, 8B and 8C show a set of bowl-shaped containers 100, 102 and 104 similar in overall configuration to the container 30 of FIG. 5, and all of which hold equal volumes of water. The container 100 has a flat bottom 108 and has a standpipe 106 extending upward from the bottom 108 of the container through which water drains to establish a water level 110 of, for example, 7¼ inches from the bottom 108, in the container 100. The container 100 has an overall height of, for example, 15 inches. The container 102 is similar to the container 100, but has a center rise 112 extending upward from bottom 114. A shorter standpipe 116 extends from the center rise 112 to establish a water level 118 of, for example, 5½ inches from the bottom 114. The container 102 has an overall height of 12 inches. The function of the center rise 112 is to displace volume in the container 102, so that the water level 118 is at an appropriate height for medium length stem cut flowers. The container 104 is similar to the containers 100 and 102, but has a center rise 120, which is larger than the center rise 112, extending upward from bottom 122. A hole 124 in the rise 120 establishes a water level 126 of, for example, 4½ inches from the bottom 122 in the container 104. The container 104 has an overall height of, for example, 9 inches. The rise 120 serves the same volume displacing function as the rise 112, in order to make the water level 126 of the correct height for shorter stem cut flowers. Thus, while the containers 100, 102 and 104 are of equal volume, their different configurations respectively make them suitable for displaying long stem, medium stem and short stem cut flowers.

FIG. 9 shows a display unit 130 for cut flowers utilizing the containers 100, 102 and 104 in a vertical, stacked relationship. The display unit 130 is similar in configuration to the display unit 40 of FIG. 6. The containers 100, 102 and 104 are supported in their stacked relationship by three uprights 132, 134 and a third upright 136 (FIG. 10C), not visible in FIG. 9. Unlike the display unit 40, the containers 100-102 are removably attached to the uprights 132-136 by container supports 137 and 139. A dish-shaped base 138 having a flat bottom 140, vertical side 142 and open top 144 is positioned on the uprights 132-136 below the containers 100-104. A cover 146 with the same shape as the base 138 is positioned on the uprights 132-136 above the containers 100-104 and has a flat top 148 with a reflective inside surface 150, vertical side 152 and open bottom 154. A pump 156 and ultraviolet disinfection unit 158 are concealed by the base 138. The pump is connected to receive water from the bottom container 102 and supply it through the disinfection unit 158 to the upper container 100 by a flow path through the upright 134. The bottom container 102 is permanent and provided without the standpipe 116. A dipstick 160 allows the water level in the bottom container 102 to be checked periodically and topped off as necessary to maintain a constant volume of water in the display unit 130.

Further details of the display unit 130, the uprights 132-136 and the containers 100-104 are shown in FIGS. 10A-11. Any combination of the containers 100-104 can be used above the bottom container 102. The container supports 137 have a rectangular cross section, and the container supports 139 have a round cross section. As shown in FIG. 11, the containers 100-104 have horizontal flanges 162 with round holes 164 for engaging the container supports 139 and a rectangular hole 166 for engaging the container supports 137. The standpipes 106 or 116 and the hole 124 of the containers 100-104 are located adjacent to the rectangular hole 166. This configuration of the container supports 137 and 139, their mating holes 164 and 166, and the placement of the standpipes 106 or 116 and the hole 124 relative to the rectangular hole 166 assures that the inlets and outlets for the containers 100-104 are never below and above each other, whatever selection of the containers 100-104 are inserted in the display unit 130. The containers 100-104 can only be inserted in one orientation at each level in the stack of the display unit. As in the display unit 40, the containers 100-104 have perforated dividers 168 dividing the containers 100-104 into a plurality of sectors 169.

Because the containers 100-104 have equal volumes, a premeasured quantity of Floralife or other cut flower preservative solution can be added to the water in the display unit 130 when it is set up regardless of what different combinations of the containers 100-104 are selected to make up the display unit 130. Using such a standard premeasured quantity of the preservative solution with a fixed total volume of the display unit 130 means that a constant effective dose of the preservative solution is provided each time the display unit 130 is set up, without any calculations or measurements being required.

The method of the present invention for prolonging the useful life of cut flowers incorporates continuous or intermittent circulation of disinfected liquid through liquid reservoirs of a plurality of generally vertically stacked cut flower storage and display containers. Disinfected liquid is preferably continuously circulated at a rate which provides replacement of liquid in the liquid reservoir of each container about every one minute to about every one hour, and most preferably about every one to three minutes. Incorporation of an ultraviolet disinfection unit eliminates substantially all microorganisms from the circulating liquid. A suitable dosage of a floral preservative or nutrient, such as Floralife, is preferably introduced into the primary reservoir so that the circulating liquid contains a suitable concentration of floral preservative or nutrient. Elimination of microbial populations from the circulating liquid, including substantially all bacteria, algae, viruses, yeasts, molds, and fungi, and circulation of floral preservative, significantly prolong the useful life of cut flowers and plant materials. Many different configurations of display rack assemblies may be provided utilizing the cut flower storage and display containers, racks, and/or liquid circulation and disinfection system of the present invention.

The above display units are suitable for display of large numbers of cut flowers, such as for sale of the flowers. Smaller units can be used to practice the invention with individual vases. FIG. 12 shows a display unit 170 having a vase 172 supported on a base 174. A pump 176 and an ultraviolet disinfection unit 178 in the base 174 are connected to circulate water through the disinfection unit 178 and the vase 172. In FIG. 13, a submersible unit 180 incorporating a miniaturized pump 182 and an ultraviolet disinfection unit 184 circulates water in vase 186. The ultraviolet disinfection units 178 and 184 utilize the same treatment conditions with the ultraviolet light as in the disinfection units 94 and 158.

Cut flower storage and display containers 10 and 30 preferably comprise a metallic material such as stainless steel which conducts temperature and retains coolness. Containers 10 and 30 may alternatively be molded from a rigid plastic material, such as high impact polystyrene or a similar plastic material, such as polyethylene, polypropylene, or the like. Suitable materials are well known in the art.

While in the foregoing specification this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A cut flower storage and display arrangement comprising:
    a plurality of cut flower storage and display containers defining a plurality of liquid reservoirs arranged in a vertically spaced relationship, each of said cut flower storage and display containers having liquid circulation means for circulating liquids among said liquid reservoir; and
    a liquid circulation and disinfection system in operative communication with said cut flower storage and display containers, said liquid circulation and disinfection system including an ultraviolet disinfection unit;
    wherein each of said containers comprises a generally bowl-shaped cut flower storage and display container having a generally planar circular bottom surface, a continuous side wall having a lower peripheral edge joined to a peripheral edge of said bottom surface and an upper peripheral edge having a greater circumference than said lower peripheral edge, and wherein said bottom surface and said side wall define said liquid reservoir for confining liquid and said upper peripheral edge serves as a cut flower supporting surface.

2. The cut flower storage and display arrangement according to claim 1, wherein said ultraviolet disinfection unit is capable of producing a dosage of short wavelength of ultraviolet light which is lethal to substantially all microorganisms.

3. The cut flower storage and display arrangement according to claim 2, wherein said ultraviolet disinfection unit provides ultraviolet light at wavelengths of about 252 to about 255 nanometers.

4. The cut flower storage and display arrangement according to claim 3, wherein said ultraviolet disinfection unit provides ultraviolet light at wavelengths of about 253.7 nanometers.

5. The cut flower storage and display arrangement according to claim 3, wherein said ultraviolet disinfection unit provides a dosage of ultraviolet light of about 3,000 to about 50,000 microwatt-seconds per square centimeter.

6. The cut flower storage and display arrangement according to claim 5, wherein said ultraviolet disinfection unit provides a dosage of ultraviolet light of about 3,000 to about 20,000 microwatt-seconds per square centimeter.

7. The cut flower storage and display arrangement according to claim 2, additionally comprising an air cooling means directing cooled circulating air having a temperature of about 45° F. to about 55° F. in the vicinity of said cut flower storage and display container.

8. A cut flower storage and display arrangement according to claim 1, wherein said liquid discharge means comprises at least one aperture in said side wall.

9. A cut flower storage and display arrangement according to claim 8, wherein each of said bowl-shaped cut flower storage and display containers is divided into a plurality of contiguous receptacles by means of perforated dividers mounted in said liquid reservoirs.

10. A cut flower storage and display arrangement according to claim 1, additionally comprising a supporting structure including a plurality of upright vertical supports arranged in a radial configuration in proximity to said upper peripheral edges of said containers for maintaining said bowl-shaped containers in said vertically aligned relationship.

11. A cut flower storage and display container according to claim 10, wherein each of said bowl-shaped containers additionally comprises an annular flange joined to and extending outwardly from said upper peripheral edge of said side wall, and said annular flanges are provided with attachment means for mounting said bowl-shaped containers to said supporting structure.

12. A cut flower storage and display arrangement comprising:
 a plurality of cut flower storage and display containers defining a plurality of liquid reservoirs arranged in a vertically spaced relationship, each of said cut flower storage and display containers having liquid circulation means for circulating liquids among said liquid reservoir; and
 a liquid circulation and disinfection system in operative communication with said cut flower storage and display containers, said liquid circulation and disinfection system including an ultraviolet disinfection unit;
 wherein each of said containers comprises a generally trough-shaped cut flower storage and display container, and wherein each of said trough-shaped cut flower storage and display containers is divided into a plurality of contiguous receptacles by means of perforated dividers mounted in said liquid reservoirs.

13. A cut flower storage and display arrangement comprising:
 a plurality of cut flower storage and display containers defining a plurality of liquid reservoirs arranged in a vertically spaced relationship, each of said cut flower storage and display containers having liquid circulation means for circulating liquids among said liquid reservoir; and
 a liquid circulation and disinfection system in operative communication with said cut flower storage and display containers, said liquid circulation and disinfection system including an ultraviolet disinfection unit;
 in which said plurality of cut flower storage and display containers have equal volumes and different configurations to receive flowers with stems of different lengths.

14. A cut flower storage and display arrangement according to claim 13, wherein each of said plurality of containers comprises a generally bowl-shaped cut flower storage and display container having a circular bottom surface, a continuous side wall having a lower peripheral edge joined to a peripheral edge of said bottom surface and an upper peripheral edge having a greater circumference than said lower peripheral edge, and wherein said bottom surface and said side wall define said liquid reservoir for confining liquid and said upper peripheral edge serves as a cut flower supporting surface, at least one of said plurality of containers having said bottom with a raised portion.

15. A cut flower storage and display arrangement according to claim 14 in which at least some of said plurality of cut flower storage and display containers are removably arranged in the vertically spaced relationship.

* * * * *